(12) United States Patent
Szeremeta et al.

(10) Patent No.: US 7,768,776 B1
(45) Date of Patent: Aug. 3, 2010

(54) DISK DRIVE ENCLOSURE WITH A SLIDING DOOR HAVING TABS WITH ADJACENT THROUGH-SLOTS

(75) Inventors: Wally Szeremeta, Mission Viejo, CA (US); Brian Nihei, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 97 days.

(21) Appl. No.: 12/253,520

(22) Filed: Oct. 17, 2008

(51) Int. Cl.
*G06F 1/16* (2006.01)

(52) U.S. Cl. .................................. 361/679.33; 360/133
(58) Field of Classification Search ............ 361/679.33; 360/133
See application file for complete search history.

(56) References Cited

U.S. PATENT DOCUMENTS

| | | | | |
|---|---|---|---|---|
| 4,717,981 | A * | 1/1988 | Nigam et al. ................ 360/133 |
| 4,736,356 | A * | 4/1988 | Konshak ..................... 720/646 |
| 5,547,142 | A * | 8/1996 | Cheatham et al. ......... 242/338.1 |
| 5,570,252 | A * | 10/1996 | Sumner et al. ............... 360/133 |
| 5,704,660 | A | 1/1998 | Smith |
| 5,924,780 | A * | 7/1999 | Ammon et al. .......... 312/223.2 |
| 6,062,663 | A * | 5/2000 | You et al. ................. 312/223.2 |
| 6,102,501 | A | 8/2000 | Chen et al. |
| 6,132,019 | A | 10/2000 | Kim et al. |
| 6,134,116 | A | 10/2000 | Hoss et al. |
| 6,219,226 | B1 * | 4/2001 | Bullington et al. ..... 361/679.37 |
| 6,233,215 | B1 * | 5/2001 | Paul et al. ................... 720/647 |
| 6,307,745 | B1 * | 10/2001 | Liebenow .............. 361/679.55 |
| 6,351,374 | B1 | 2/2002 | Sherry |
| 6,581,865 | B1 * | 6/2003 | Zweighaft et al. ........... 360/132 |
| 6,604,701 | B2 * | 8/2003 | Hoge .......................... 360/132 |
| 6,618,245 | B2 | 9/2003 | Diaz |
| 6,836,412 | B2 | 12/2004 | Kim et al. |
| 6,873,524 | B2 | 3/2005 | Kaczeus, Sr. et al. |
| 6,891,721 | B2 | 5/2005 | Huang |
| D515,090 | S | 2/2006 | Huang |
| 7,055,160 | B1 | 5/2006 | Tan et al. |
| D531,178 | S | 10/2006 | Lee |
| 7,255,409 | B2 | 8/2007 | Hu et al. |
| 7,327,566 | B2 | 2/2008 | Zhao |
| 7,405,928 | B2 * | 7/2008 | Robertson et al. ....... 361/679.33 |
| 2009/0009953 | A1 * | 1/2009 | Lin ........................... 361/685 |

* cited by examiner

*Primary Examiner*—Lisa Lea-Edmonds

(57) ABSTRACT

An information storage device includes a housing having a cavity, and a sliding door partially covering the cavity. The housing has a first groove and a second groove on opposite sides of the cavity. The sliding door includes first and second edges adjacent the first and second grooves, respectively. The sliding door also includes first and second tabs protruding from the first and second edges into the first and second grooves, respectively. The first and second tabs define first and second tab lengths measured parallel to the first and second edges, respectively. There are first and second through-slots in the sliding door adjacent the first and second tabs, respectively. The first and second through-slots define first and second through-slot lengths measured parallel to the first and second edges, respectively. The first and second through-slot lengths are greater than the first and second tab lengths, respectively.

15 Claims, 11 Drawing Sheets

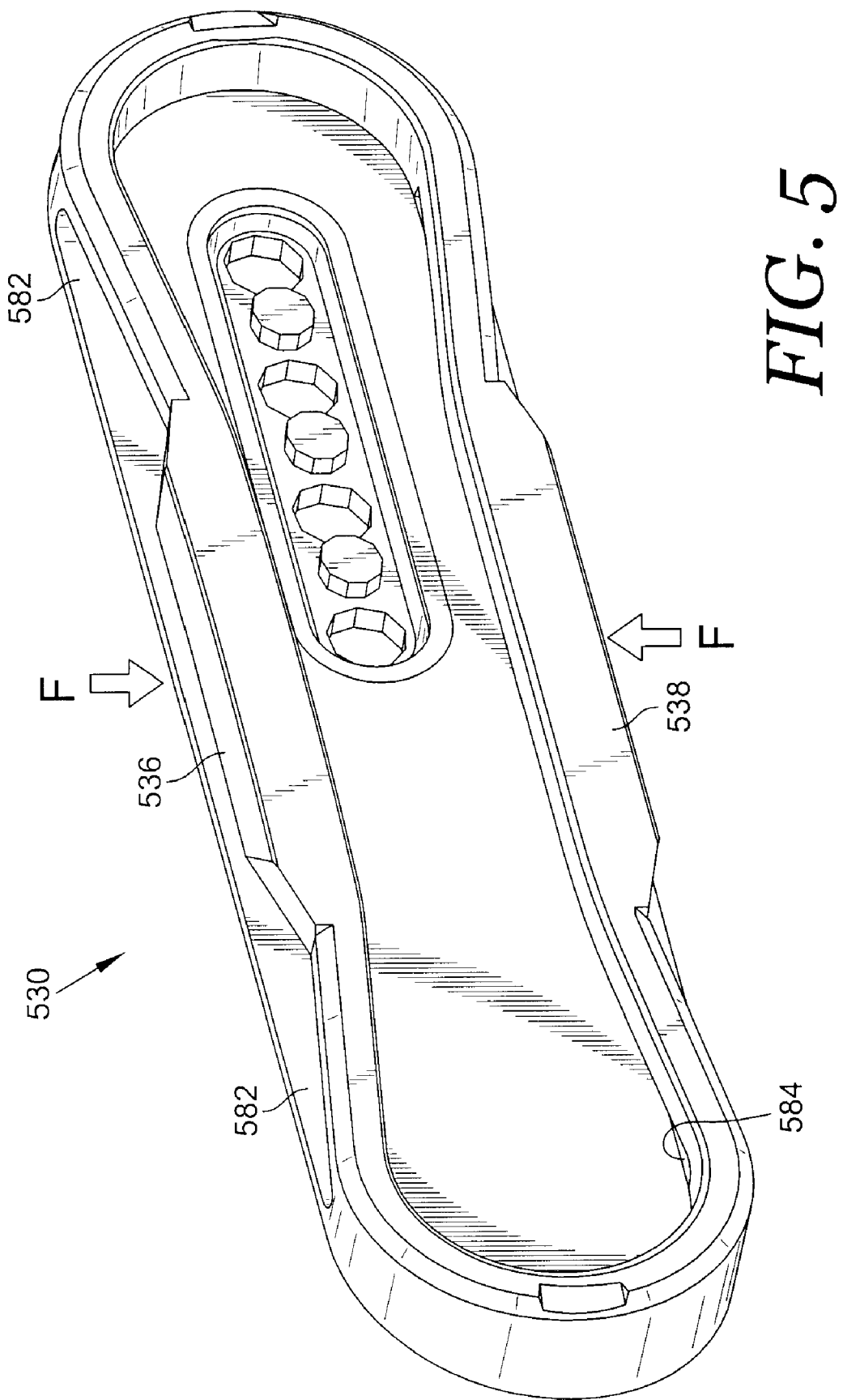

DISK DRIVE ENCLOSURE WITH A SLIDING DOOR HAVING TABS WITH ADJACENT THROUGH-SLOTS

BACKGROUND

1. Field of the Invention

The present invention relates generally to the field of information storage devices, and more particularly to housings for information storage devices.

2. Background of the Art

Information storage devices are used to retrieve and/or store data for computer systems and other consumer electronics products. A magnetic hard disk drive is an example of an information storage device.

Many information storage devices are housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, vibration dampening, and some degree of isolation from external mechanical shocks, etc.

Other information storage devices are not housed within the system for which they retrieve and/or store data. For example, a so-called "external" hard disk drive includes its own external housing, which may provide electromagnetic shielding, vibration dampening, some degree of isolation from external mechanical shocks, and active or passive cooling. The external housing may also include or support features to facilitate the use of the disk drive, such as lights to indicate operation, openings through which to access cable connectors, and switches to control operation.

The external housings for modern information storage devices must also often meet challenging space and cost requirements. However, the housing design and the features associated with the housing may significantly affect the manufacturability and the cost of the housing. Accordingly, there is an ongoing need in the art for improved external housings for information storage devices.

SUMMARY

A novel information storage device is disclosed and claimed. The information storage device includes a housing having a cavity, and a sliding door partially covering the cavity. The housing includes a first groove and a second groove on opposite sides of the cavity. The sliding door includes a first edge adjacent the first groove, and an opposing second edge adjacent the second groove. The sliding door also includes a first tab protruding from the first edge into the first groove, the first tab defining a first tab length measured parallel to the first edge. The sliding door also includes a second tab protruding from the second edge into the second groove, the second tab defining a second tab length measured parallel to the second edge. There is a first through-slot in the sliding door adjacent the first tab. The first through-slot defines a first through-slot length measured parallel to the first edge. There is also a second through-slot in the sliding door adjacent the second tab. The second through-slot defines a second through-slot length measured parallel to the second edge. The first through-slot length is greater than the first tab length and the second through-slot length is greater than the second tab length.

BRIEF DESCRIPTION OF DRAWINGS

FIG. 5 is a perspective view of a sliding door for a disk drive enclosure according to an exemplary embodiment of the present invention, shown being temporarily deformed by an applied force during enclosure assembly.

DETAILED DESCRIPTION OF EXEMPLARY EMBODIMENTS

Figure 1:
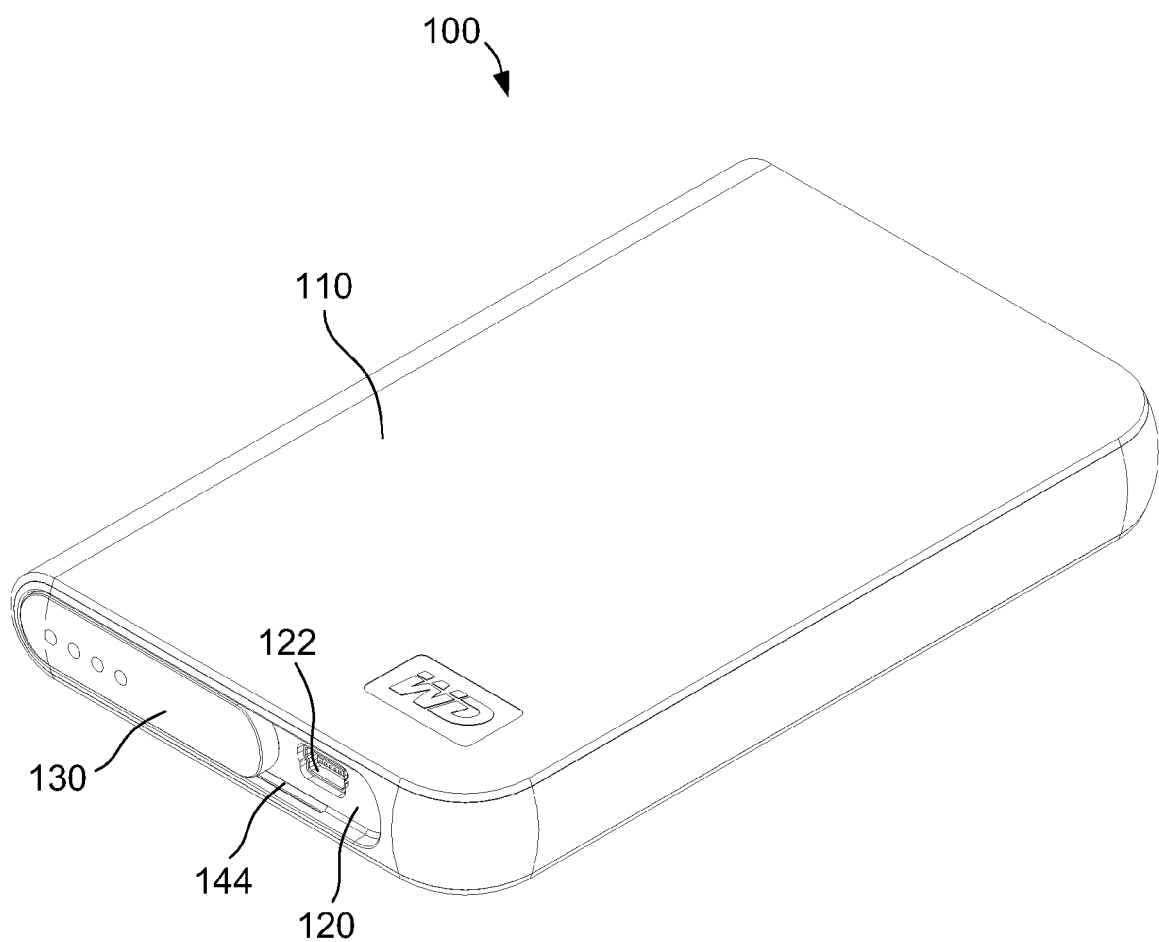
FIG. 1 is a perspective view of a disk drive enclosure according to an embodiment of the present invention.
Figure 2A:
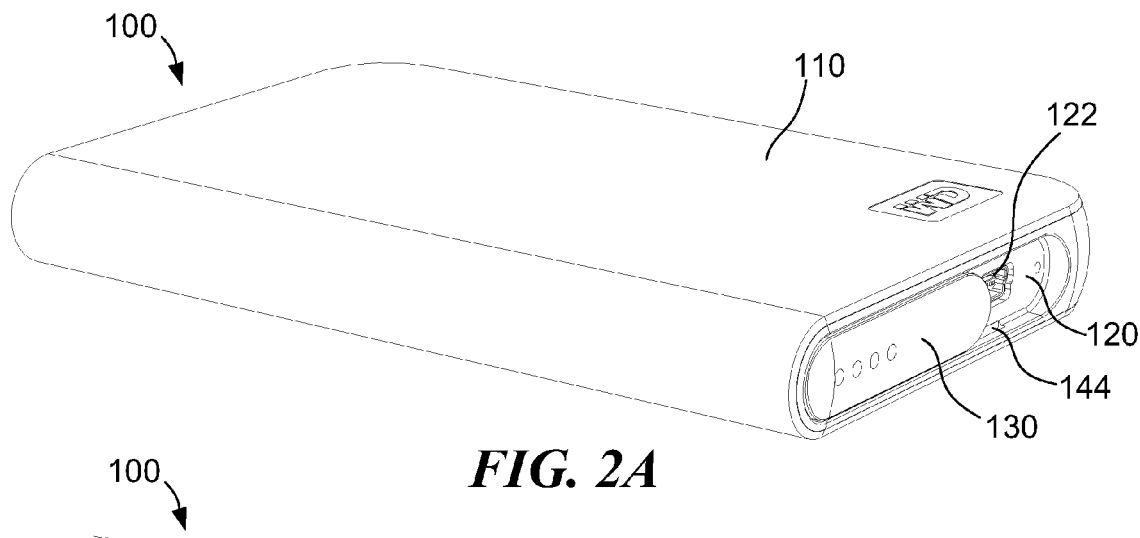
FIG. 2A is another perspective view of the disk drive enclosure of FIG. 1.

FIG. 1 is a perspective view of a disk drive enclosure 100 according to an embodiment of the present invention. FIG. 2A is another perspective view of the disk drive enclosure of FIG. 1. In the embodiment of FIGS. 1 and 2A, the enclosure 100 encloses various disk drive major components, such as the head disk assembly (HDA) and associated printed circuit boards (PCBs). For example, a disk drive controller PCB may include disk drive controller circuitry, and a bridge controller PCB may, for example, enable the disk drive to transfer data to/from a separate host computer system. Such a bridge controller PCB may include a host interface connector 122, which may be an IEEE 1394 compliant connector, an Enhanced Serial Advanced Technology Attachment (eSATA) compliant connector, or a Universal Serial Bus (USB) compliant connector as shown in the embodiment of FIG. 1. The HDA may be of various sizes or "form factors," for example 3.5", 2.5", or 1.8", among others. Since the head disk assembly and associated printed circuit boards are located within the enclosure 100, they are not visible in the view of FIG. 1.

Figure 2B:
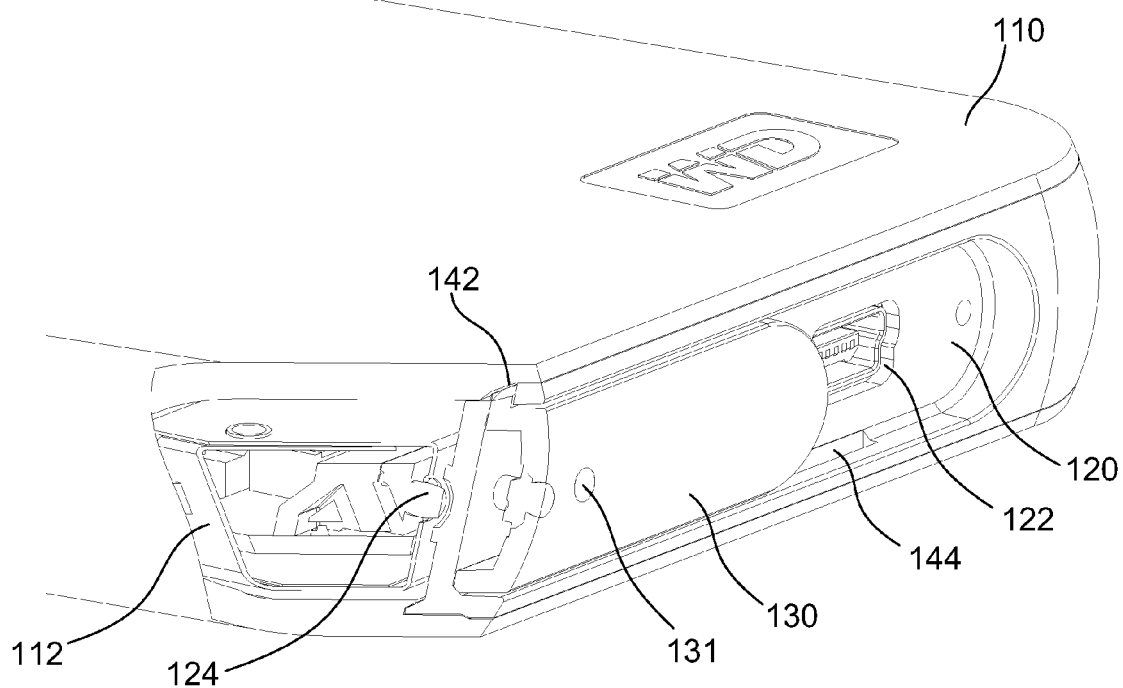
FIG. 2B is a cut-away perspective view of a portion of the disk drive enclosure of FIG. 2A.

In the embodiment of FIGS. 1 and 2A, the enclosure 100 includes a housing 110 that has a cavity 120. The cavity 120 is oval shaped and optionally includes a through opening for accommodation of the host interface connector 122. Now referring additionally to FIG. 2B, it can be seen that the cavity 120 includes a first groove 142 and a second groove 144, disposed on opposite sides of the cavity 120. These grooves may optionally be blind grooves or through slots. In the embodiment of FIGS. 1, 2A, and 2B, the sliding door 130 is able to slide, and the sliding door 130 partially covers the cavity 120, in part because the cavity 120 is longer than the sliding door 130. For example, the sliding door 130 may selectively cover or uncover the host interface connector 122.

Also, in the embodiment of FIGS. 1, 2A, and 2B, the sliding door 130 optionally includes a plurality of non-opaque aperture(s) 131 (e.g. through holes, regions of transparent or translucent plastic or glass material, etc) that permit viewing the state of indicator light(s) 124. Indicator lights 124, may, for example, indicate a state of operation of the disk drive enclosed within the enclosure 100. Although, in the embodiment of FIGS. 1, 2A, and 2B, the enclosure 100 is preferably fabricated from a plastic material having a Young's modulus in the range 2 GPa to 4 GPa, the enclosure 100 may include a conductive metal inner shield 112 that reduces the emission of electromagnetic waves from the aforementioned PCBs. The conductive metal inner shield 112 may be fabricated from a sheet metal material (e.g. steel), for example.

Figure 3:
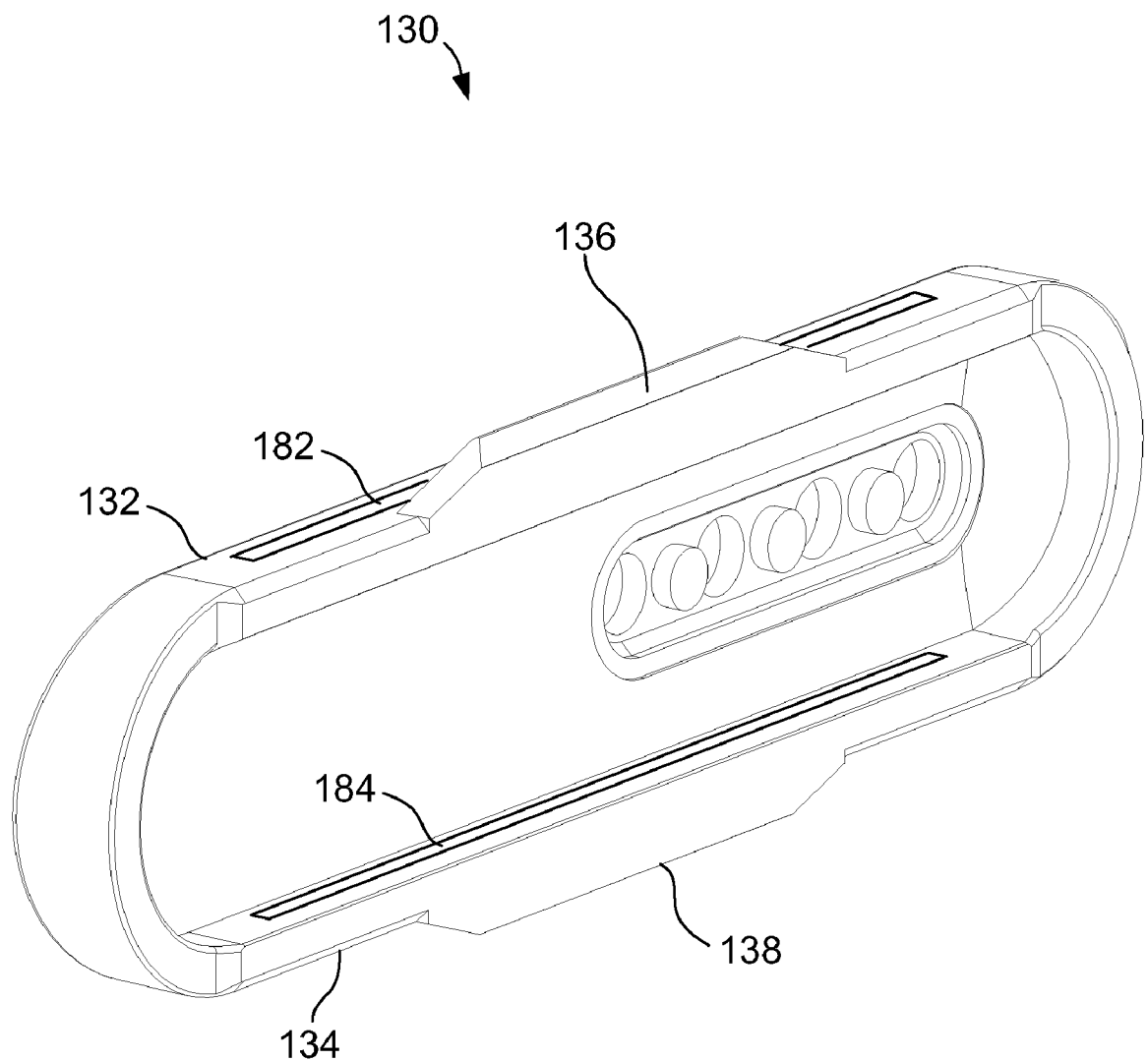
FIG. 3 is a perspective view of a sliding door for the disk drive enclosure of FIGS. 1, 2A, and 2B.
Figure 4A:
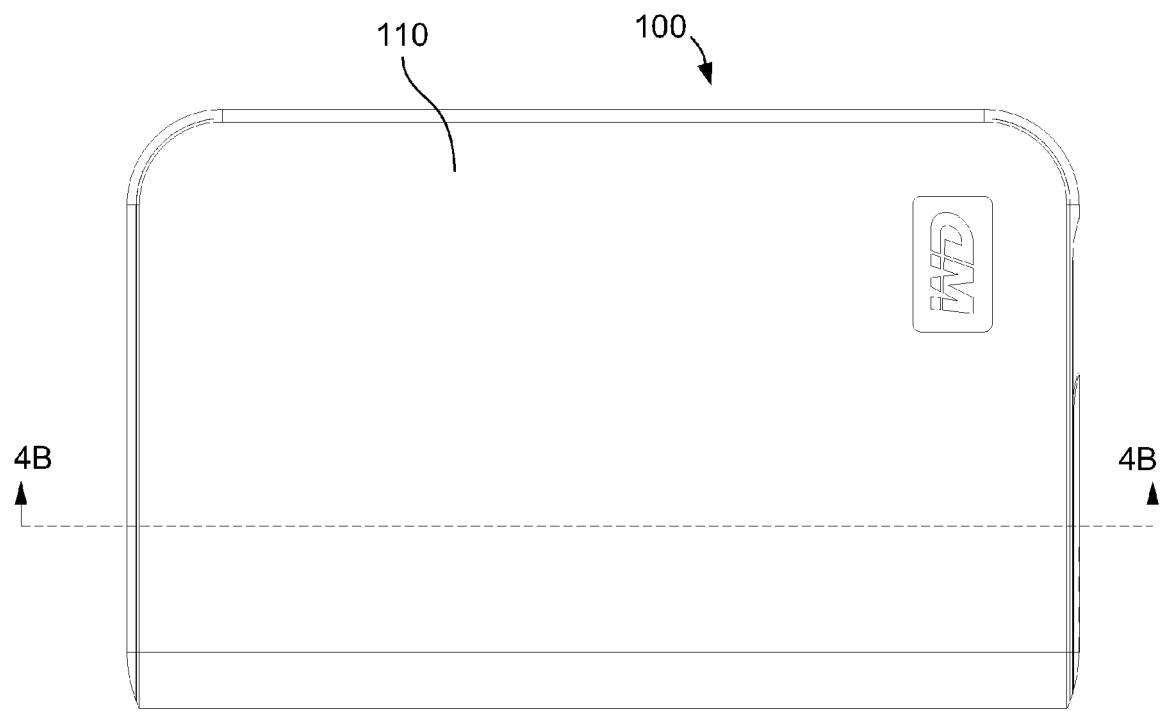
FIG. 4A is a top view of the disk drive enclosure of FIGS. 1, 2A, and 2B.
Figure 4B:
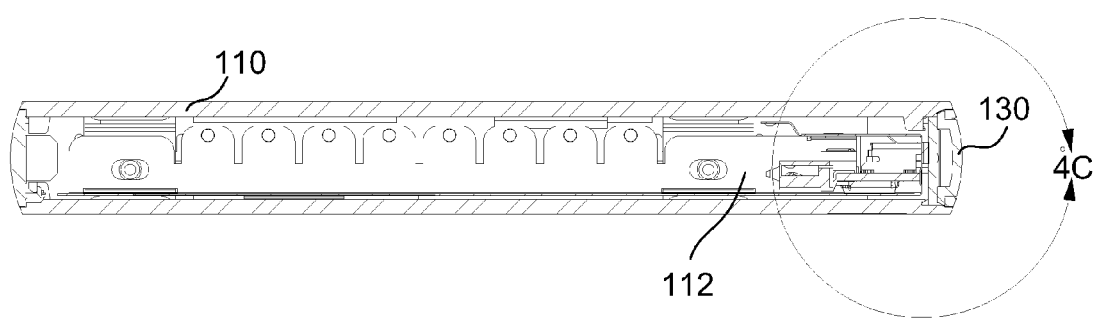
FIG. 4B is a side cross-sectional view of the disk drive enclosure of FIG. 4A.
Figure 4C:
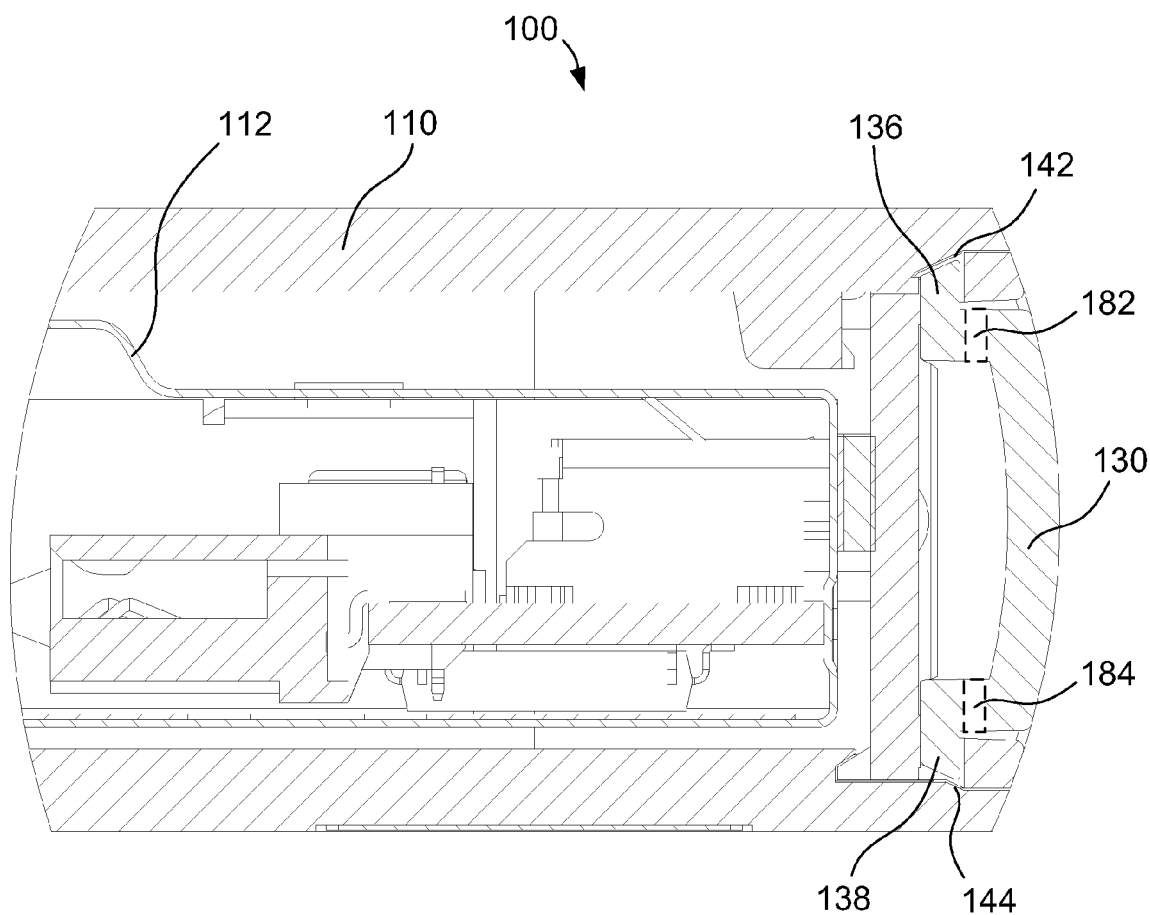
FIG. 4C is an expanded portion of the side cross-sectional view of FIG. 4B.

FIG. 3 is a back perspective view of the sliding door 130 that is shown in FIGS. 1, 2A, and 2B. FIG. 4A is a top view of the disk drive enclosure 100 that is also depicted in FIGS. 1, 2A, and 2B. FIG. 4B is a side cross-sectional view of the disk drive enclosure of FIG. 4A. FIG. 4C is an expanded portion of the side cross-sectional view of FIG. 4B. Now referring to FIGS. 1, 2A-B, 3, and 4A-C, the sliding door 130 includes a first edge 132 that, after installation into the enclosure 100, is disposed adjacent the first groove 142. The sliding door 130 also includes an opposing second edge 134 that, after installation into the enclosure 100, is disposed adjacent the second groove 144. A first tab 136 protrudes from the first edge 132 into the first groove 142. A second tab 138 protrudes from the second edge 134 into the second groove 144. The sliding door 130 also includes a first through-slot 182 that is disposed adjacent the first tab 136. The sliding door 130 also includes a second through-slot 184 that is disposed adjacent the second tab 138.

Note that the first through-slot 182, and the second through-slot 184, each defines a through-slot interior contour that is closed, so that each of the first and second tabs 136, 138 is effectively connected to the sliding door 130 by a doubly supported beam. Thus, the through-slots 182 and 184 may facilitate the temporary deformation of the first and second tabs 136, 138 of the sliding door 130, to allow the first tab 136 and second tab 138 to be practically inserted into the first groove 142 and the second groove 144 during assembly, respectively.

For example, FIG. 5 is a perspective view of a sliding door 530 according to an exemplary embodiment of the present invention, shown being temporarily deformed by an applied compressive force F during enclosure assembly. The sliding door 530 preferably comprises a plastic material having a Young's modulus in the range 2 GPa to 4 GPa (preferably the same plastic material that is included in the housing of the disk drive enclosure into which the sliding door 530 is assembled). The sliding door 530 includes a first tab 536 and a second tab 538, and a first through-slot 582 that is disposed adjacent the first tab 536, and a second through-slot 584 that is disposed adjacent the second tab 538.

Note that the first through-slot 582 defines a first through-slot interior contour that is closed, so that the first tab 536 is effectively connected to the sliding door 530 by a doubly supported beam. Thus, the through slots 582 and 584 may facilitate the temporary deformation of the first and second tabs 536, 538 of the sliding door 530, to allow the first tab 536 and second tab 538 to be practically inserted into respective grooves in the housing of a disk drive enclosure during assembly. For example, practical insertion may require adequate deformation without yielding or damage to the sliding door 530.

Figure 6A:
FIG. 6A is a perspective view of a frame subcomponent of a disk drive enclosure according to an embodiment of the present invention.
Figure 6B:
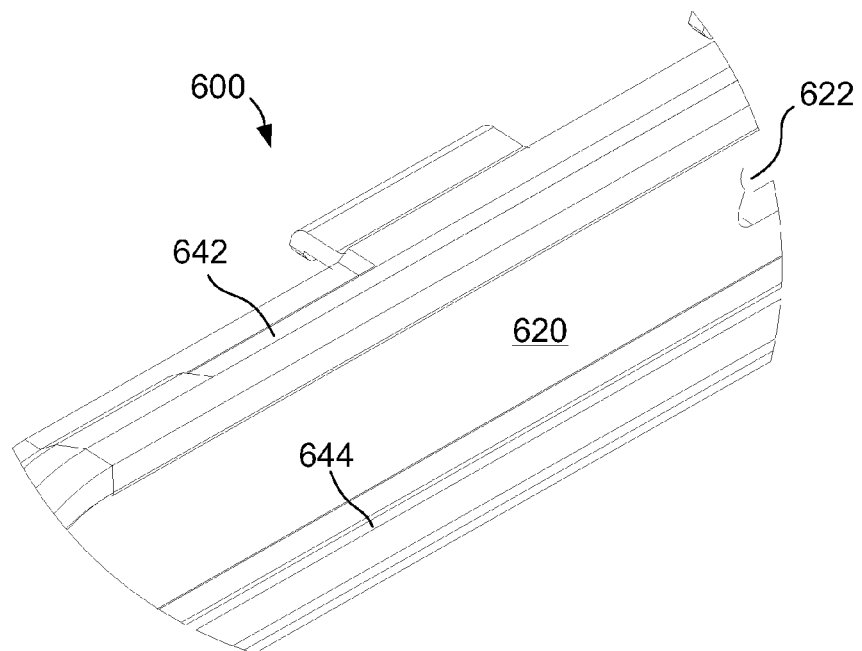
FIG. 6B is an expanded portion of the view of FIG. 6A.

FIG. 6A is a perspective view of a frame subcomponent 600 of a disk drive enclosure according to an embodiment of the present invention. FIG. 6B is an expanded portion of the view of FIG. 6A. In the embodiment of FIGS. 6A and 6B, the frame subcomponent 600 provides a cavity 620 to the disk drive enclosure. The frame subcomponent also provides a first groove 642 and an opposing second groove 644 to guide and retain a sliding door. Although the first groove 642 and the second groove 644 are depicted as through slots in the frame subcomponent 600, they could optionally be blind grooves (i.e. grooves that do not penetrate all the way through the material of the frame subcomponent 600). The second groove 644 defines a groove length 648. In the embodiment of FIGS. 6A and 6B, the frame subcomponent also optionally provides a through hole 622 within the cavity 620, to accommodate a host interface connector.

Figure 7:
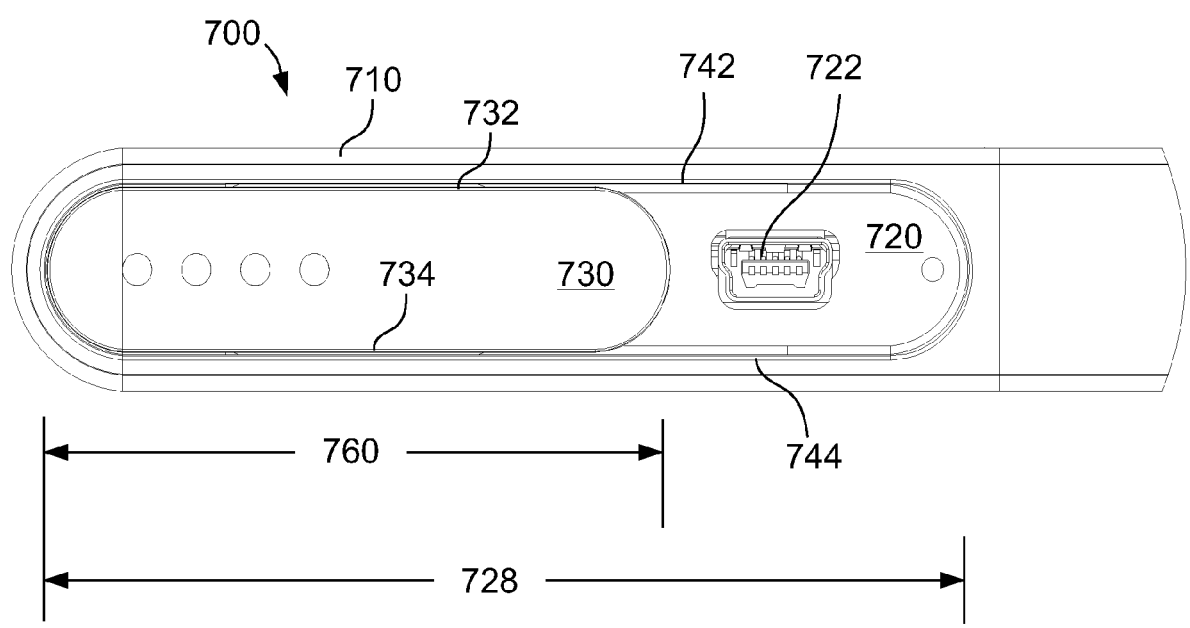
FIG. 7 is an end view of a disk drive enclosure according to an embodiment of the present invention.

FIG. 7 is an end view of a disk drive enclosure 700 according to an embodiment of the present invention. The enclosure 700 includes a housing 710 that has a cavity 720. The cavity 720 is oval shaped, defines a cavity length 728, and optionally includes a through opening for accommodation of a host interface connector 722. The enclosure 700 also includes a sliding door 730 defining a door length 760. The sliding door 730 includes a first edge 732 that, after installation into the enclosure 700, is disposed adjacent a first housing groove 742. The sliding door 730 also includes an opposing second edge 734 that, after installation into the enclosure 700, is disposed adjacent a second housing groove 744. In the embodiment of FIG. 7, the cavity length 728 exceeds the door length 760. The door length 760, which is measured parallel to the first edge 732, is preferably also less than the length of each of the grooves 742, 744 (e.g. defined as is groove length 648 in FIG. 6A). These inequalities may facilitate that the sliding door 730 can slide, and that the sliding door 730 may partially cover the cavity 720. For example, the sliding door 730 may selectively cover or uncover the host interface connector 722.

Figure 8:
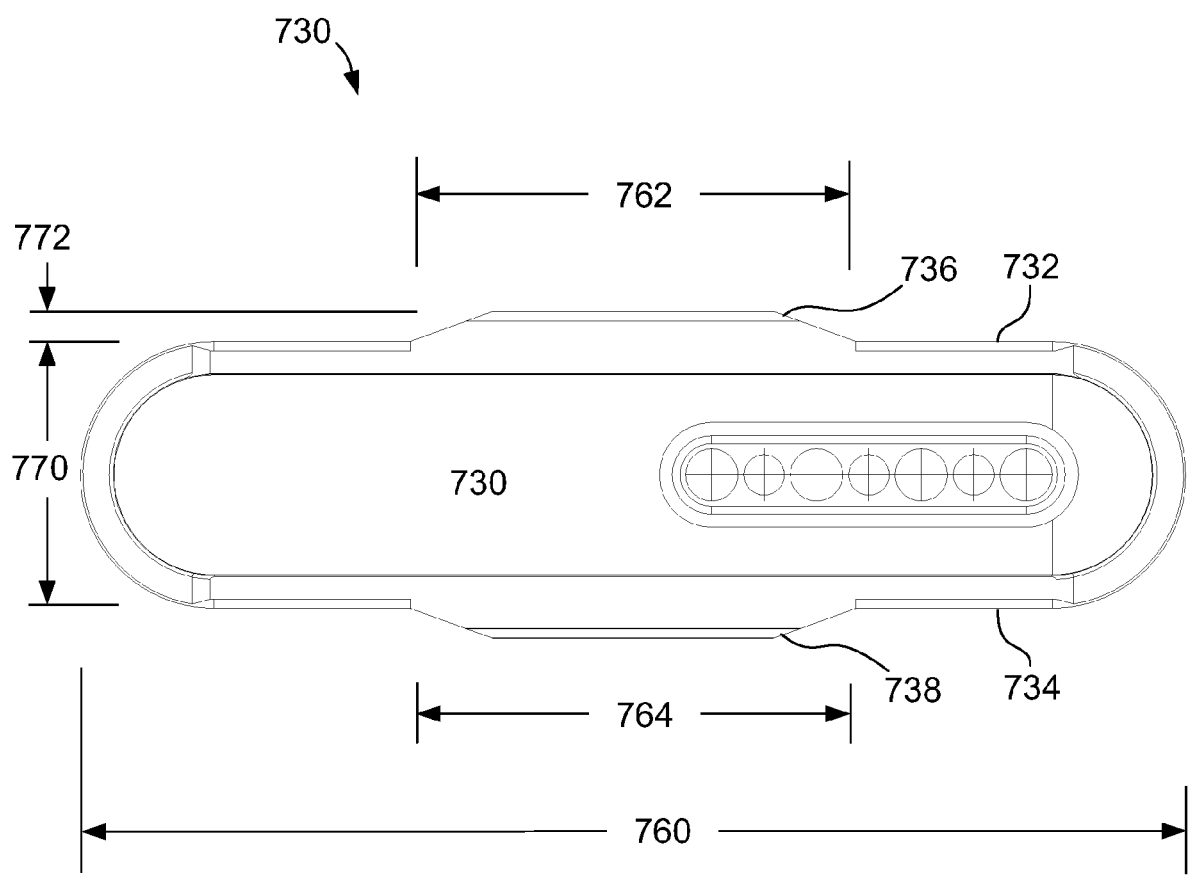
FIG. 8 depicts a sliding door for the disk drive enclosure of FIG. 7.

FIG. 8 depicts the sliding door 730 of the disk drive enclosure of FIG. 7. Now referring to FIGS. 7 and 8, the sliding door 730 includes a first tab 736 that protrudes from the first edge 732 into the first groove 742. The sliding door 730 includes a second tab 738 that protrudes from the second edge 734 into the second groove 744. The first tab 736 defines a first tab length 762 measured parallel to the first edge 732. The second tab 738 defines a second tab length 764 measured parallel to the second edge 734. Each of the first and second tab lengths 762, 764 is preferably in the range 30% to 70% of the door length 760, which in the embodiment of FIG. 8 may enhance sliding door stability while providing adequate sliding door mobility. The length of each of the first and second grooves 742 and 744 (e.g. defined as is groove length 648 in FIG. 6A) is greater than each of the first and second tab lengths 762 and 764. However, the first tab length 762 is preferably at least three times a smallest internal dimension of the first groove 742, and the second tab length 764 is preferably at least three times a smallest internal dimension of the second groove 744. For example, the smallest internal dimension of a groove may be its width or depth, but not its length.

In certain embodiments these dimensional inequalities and constraints may enhance angular stability of the sliding door 730 in view of the play allowed by practical manufacturing tolerances.

Still referring to FIGS. 7 and 8, the sliding door 730 defines a sliding door height 770 measured from the first edge 732 to the opposing second edge 734 in a height direction orthogonal to the first edge 732. The first tab 762 defines a first tab height 772 measured in the height direction. The first tab height is preferably in the range 1 mm to 3 mm, which in certain embodiments may facilitate adequate engagement area between the sliding door 730 and the disk drive enclosure housing (for retention and stability of the sliding door 730) while preventing overstress of the material of the sliding door 730 during assembly.

Figure 9A:
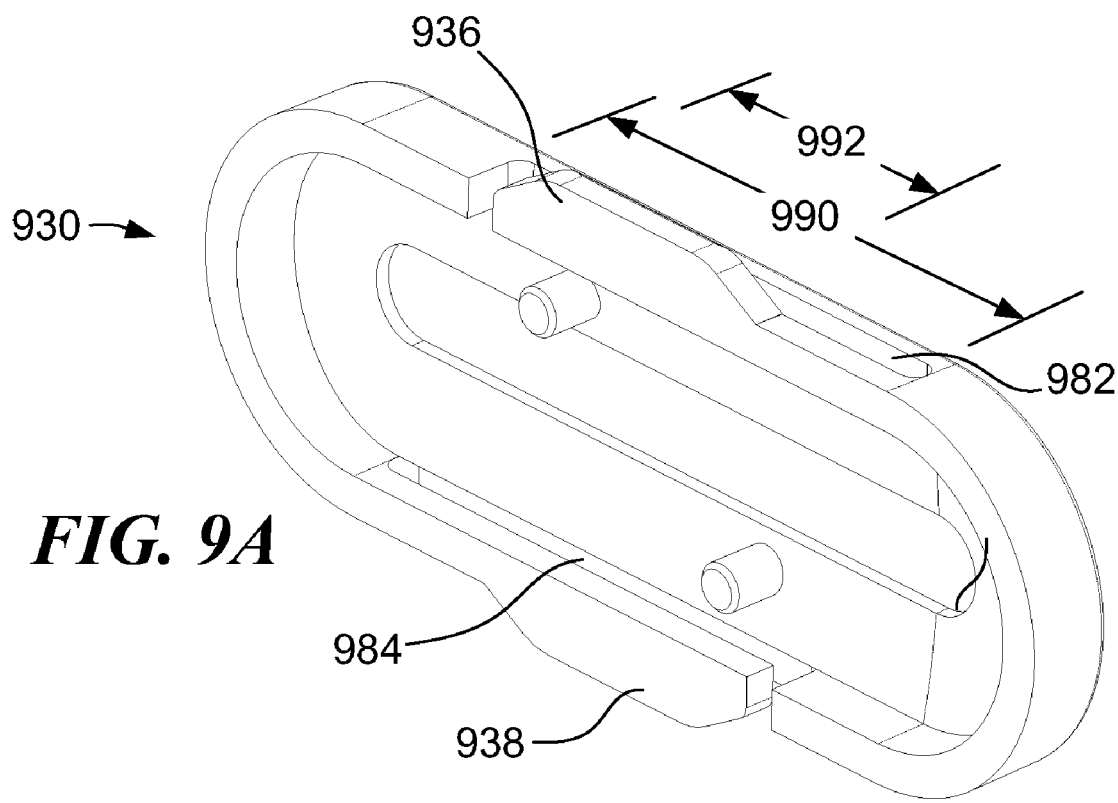
FIG. 9A is a back perspective view of a sliding door for a disk drive enclosure according to an exemplary embodiment of the present invention.
Figure 9B:
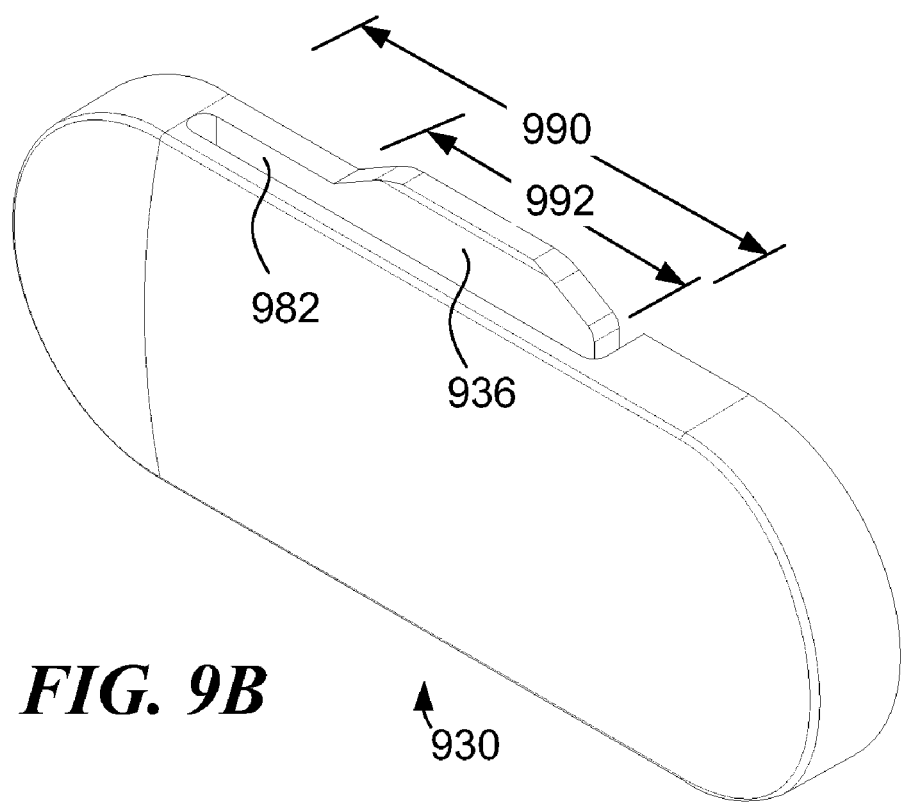
FIG. 9B is a front perspective view of the sliding door of FIG. 9A.

FIG. 9A is a back perspective view of a sliding door 930 for a disk drive enclosure according to an exemplary embodiment of the present invention. FIG. 9B is a front perspective view of the sliding door 930 of FIG. 9A. Now referring additionally to FIGS. 9A and 9B, sliding door 930 includes a first through-slot 982 that defines a first through-slot length 990 and is disposed adjacent a first tab 936. Sliding door 930 also includes a second through-slot 984 of the same length, that is disposed adjacent a second tab 938. Note that each of the first and second through-slots 982, 984 defines a through-slot interior contour that is open, so that each of the first and second tabs 936, 938 is effectively connected to the sliding door 930 by a cantilevered beam. Preferably, the resulting cantilevered beams and the sliding door 930 are a single monolithic component having material continuity rather than being an assembly of subcomponents.

In the embodiment of FIGS. 9A and 9B, the first tab 936 defines a first tab length 992, and the second tab 938 defines the same length. It is clear from FIGS. 9A and 9B that the first through-slot length 990 is greater than the first tab length 992. For example, the first through slot length 990 is preferably at least 1.4 times the first tab length 992, which, in the embodiment of FIGS. 9A and 9B, may provide adequate vertical compliance of the first and second tabs 936, 938 to facilitate assembly of the sliding door 930 into housing grooves of a corresponding disk drive enclosure. Moreover, the length of each housing groove (e.g. groove length 648 in FIG. 6A) is preferably greater than the first through-slot length (e.g. first through-slot length 990). Also, the first through-slot length 990 exceeds the first tab length 992 by at least 10 times the height of the first tab 936 (e.g. defined as is first tab height 772 in FIG. 8). These inequalities may, in certain embodiments, ensure adequate vertical compliance of the first tab 936 to facilitate assembly without overstressing the material of the sliding door 930.

Figure 10A:
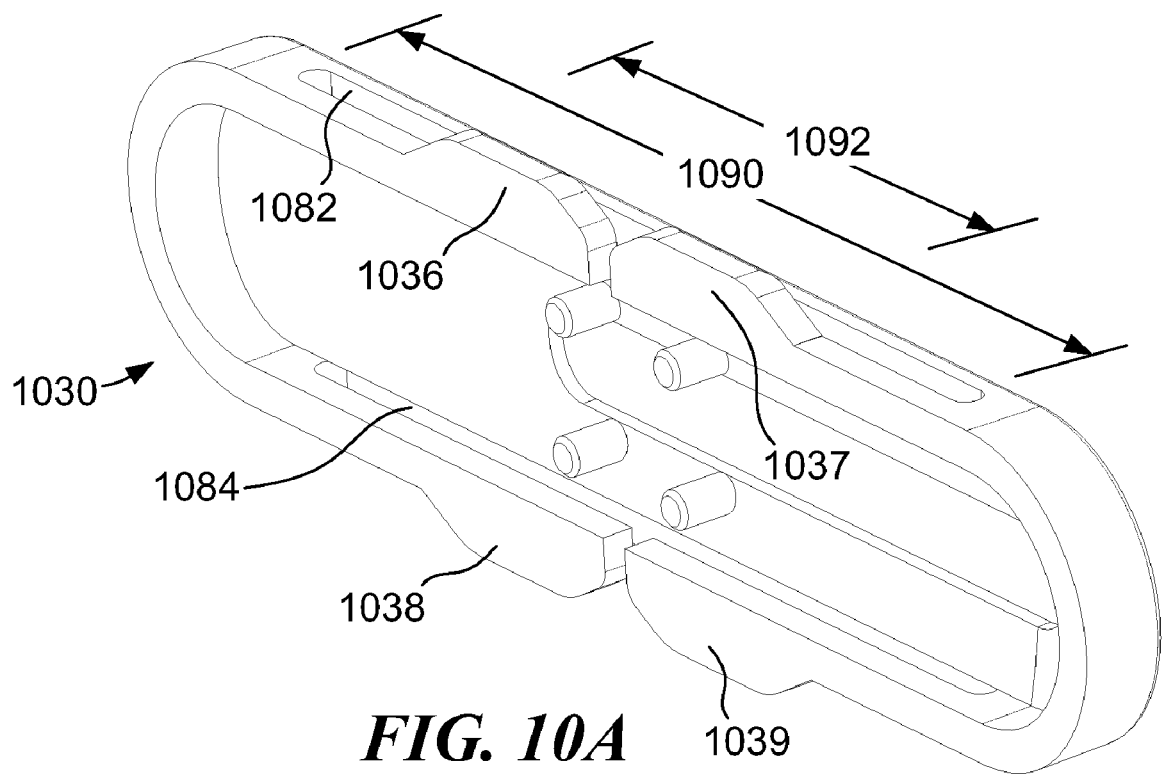
FIG. 10A is a back perspective view of a sliding door for a disk drive enclosure according to an exemplary embodiment of the present invention.
Figure 10B:
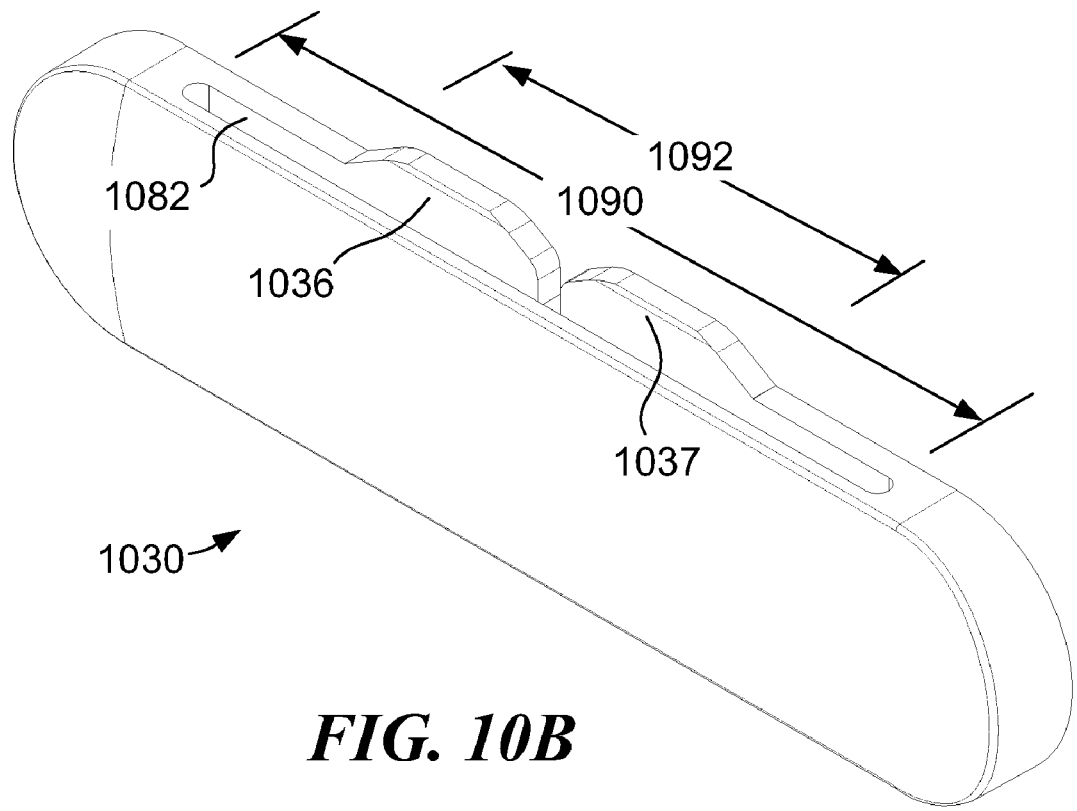
FIG. 10B is a front perspective view of the sliding door of FIG. 10A.

FIG. 10A is a back perspective view of a sliding door 1030 for a disk drive enclosure according to an exemplary embodiment of the present invention. FIG. 10B is a front perspective view of the sliding door 1030 of FIG. 10A. Now referring additionally to FIGS. 10A and 10B, sliding door 1030 includes a first through-slot 1082 that defines a first through-slot length 1090 and is disposed adjacent first tabs 1036, 1037. Sliding door 1030 also includes a second through-slot 1084 of the same length that is disposed adjacent second tabs 1038, 1039. Note that each of the first and second through-slots 1082, 1084 defines a through-slot interior contour that is open, so that each of the first and second tabs 1036, 1037, 1038, 1039 are effectively connected to the sliding door 1030 by a cantilevered beam. Preferably, the resulting cantilevered beams and the sliding door 1030 are a single monolithic component having material continuity rather than being an assembly of subcomponents In the embodiment of FIGS. 10A and 10B, the first tabs 1036 and 1037 collectively define a first tab length 1092, and the second tabs 1038 and 1039 collectively define the same length. It is clear from FIGS. 10A and 10B that the first through-slot length 1090 is greater than the first tab length 1092. For example, the first through slot length 1090 is preferably at least 1.4 times the first tab length 1092, which, in the embodiment of FIGS. 10A and 10B, may provide adequate vertical compliance of the first and second tabs 1036, 1037, 1038, 1039 to facilitate assembly of the sliding door 1030 into housing grooves of a corresponding disk drive enclosure. Moreover, the length of each housing groove (e.g. groove length 648 in FIG. 6A) is preferably greater than the first through-slot length (e.g. first through-slot length 1090). Also, the first through-slot length 1090 exceeds the first tab length 1092 by at least 10 times the height of the first tabs 1036, 1037 (e.g. defined as is first tab height 772 in FIG. 8). These inequalities may, in certain embodiments, ensure adequate vertical compliance of the first tabs 1036, 1037 to facilitate assembly without overstressing the material of the sliding door 1030.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive enclosure comprising:
    a housing having a cavity, and a first groove and a second groove on opposite sides of the cavity;
    a sliding door partially covering the cavity, the sliding door including;
        a first edge adjacent the first groove;
        an opposing second edge adjacent the second groove;
        a first tab protruding from the first edge into the first groove, the first tab defining a first tab length measured parallel to the first edge;
        a second tab protruding from the second edge into the second groove, the second tab defining a second tab length measured parallel to the second edge;
        a first through-slot in the sliding door adjacent the first tab, the first through-slot defining a first through-slot length measured parallel to the first edge;
        a second through-slot in the sliding door adjacent the second tab, the second through-slot defining a second through-slot length measured parallel to the second edge;
        wherein the first through-slot length is greater than the first tab length and the second through-slot length is greater than the second tab length.

2. The disk drive enclosure of claim 1 wherein the sliding door comprises a plastic material having a Young's modulus in the range 2 GPa to 4 GPa.

3. The disk drive enclosure of claim 2 wherein the housing and the sliding door comprise the same material.

4. The disk drive enclosure of claim 1 wherein the first groove defines a first groove length that is greater than the first tab length and greater than the first through-slot length.

5. The disk drive enclosure of claim 1 wherein the second groove defines a second groove length that is greater than the second tab length and greater than the second through-slot length.

6. The disk drive enclosure of claim 4 wherein the sliding door defines a door length measured parallel to the first edge, and wherein the first groove length is greater than the door length.

7. The disk drive enclosure of claim 6 wherein the first tab length is in the range 30% to 70% of the door length.

8. The disk drive enclosure of claim 1 wherein the first through slot length is at least 1.4 times the first tab length.

9. The disk drive enclosure of claim 1 wherein the first tab defines a first tab height measured in a height direction orthogonal to the first edge, and wherein the first tab height is in the range 1 mm to 3 mm.

10. The disk drive enclosure of claim 9 wherein the first through-slot length exceeds the first tab length by at least 10 times the first tab height.

11. The disk drive enclosure of claim 1 wherein the first through-slot defines a first through-slot interior contour that is closed, so that the first tab is connected to the sliding door by a doubly supported beam.

12. The disk drive enclosure of claim 11 wherein the sliding door and the doubly supported beam are a single monolithic component having material continuity rather than being an assembly of subcomponents.

13. The disk drive enclosure of claim 1 wherein the first through-slot defines a first through-slot interior contour that is open, so that the first tab is connected to the sliding door by a cantilevered beam.

14. The disk drive enclosure of claim 13 wherein the sliding door and the cantilevered beam are a single monolithic component having material continuity rather than being an assembly of subcomponents.

15. The disk drive enclosure of claim 1 wherein the first tab length is at least three times a smallest internal dimension of the first groove.

\* \* \* \* \*